Aug. 25, 1953 — T. E. RASSIEUR — 2,650,071

MINING DRILL

Filed March 10, 1950

INVENTOR:
THEODORE E. RASSIEUR
BY
ATTORNEYS.

Patented Aug. 25, 1953

2,650,071

UNITED STATES PATENT OFFICE 2,650,071

MINING DRILL

Theodore E. Rassieur, University City, Mo., assignor to Central Mine Equipment Company, St. Louis, Mo., a corporation of Missouri Application March 10, 1950, Serial No. 148,826

7 Claims. (Cl. 255—61)

This invention relates generally to mining drills, and particularly to drills of the character having removable cutting heads. Mining drills with removable cutting heads are known in the art. However, the removable cutting heads known heretofore have been fabricated in one piece. Cutting heads with bits offset from the axis of the drill, so as to cut a hole larger than the drill shaft, are also known in the art. Cutting heads of this character are often made U-shaped in front elevation. These offset cutting heads product a core of a diameter on the order of the amount of space between the bits. The core produced by these offset bits impedes the progress of the drill. The U-shaped cutting heads of the prior art meet this core almost at right angles to the axis of the core, so that no significant core breaking surface is available. Moreover, the provision of an integral core breaking edge in such a construction is virtually impossible because of the difficulties of fabrication and grinding. Separate core breaking elements are sometimes fastened between the bits, but this is costly and time-consuming both in manufacture and operation.

One object of this invention is to provide a segmented removable cutting head. Another object is to provide such a cutting head having a core breaking element integral with each segment. Other objects will become apparent to those skilled in the art, when the following description is read in connection with the accompanying drawings.

In accordance with this invention, a removable cutting head is provided, composed of identical segments. Each of the segments is provided with a shaft section, a core breaking or cutting web, and an offset bit head. In addition, and of great importance, each single cutting head section is provided with a core breaking web which may be ground to form a cutting edge. The cutting or core breaking edge of the web extends diagonally from a point near the bit head to the axis of rotation of the drill stem, so that a large and effective cutting surface is presented to the core. The shank sections of the segments may be formed so that, when assembled, they fit a standard polygonal socket.

Referring to the drawings.

Figure 7:
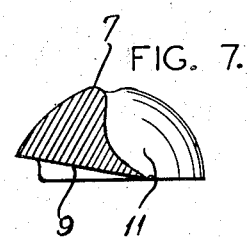
Figure 7 is a sectional view taken along the line 7—7 of Figure 6.

Referring now to the illustrative embodiment shown in the drawings, I represents an assembled cutting head made in accordance with this invention. The cutting head 1 is composed of two identical cutting head segments 2. The cutting head segments 2, when assembled, fit within an axially-disposed polygonal mouth at the forward end of socket 3, where they may be secured by a transverse pin 4 against displacement. Each of the individual cutting head segments 2 is provided with an elongate half-shank 8 having a rounded cap 20, a core breaking web 9, and a bit head 10. Core breaking web 9 is provided with a cutting edge 11. The core breaking web 9 is beveled from an outer thick bit head supporting section 7 to its inner core breaking or cutting edge 11, as shown in Figure 7. The straight cutting edge 11 extends forwardly and outwardly from a point near the bit head 10 to the axis of rotation of the drill stem. The inside surface 12 of each of half-shank sections 8 is made flat faced, so that a smooth joint is assured between any two half-shank sections. Each half-shank section 8 is provided with a hole 15 located on the longitudinal axis at a uniform position, and adapted to receive the pin 4 which passes through two such half-shank sections disposed within an auger socket 3. Auger socket 3 is normally flighted.

Figure 1:
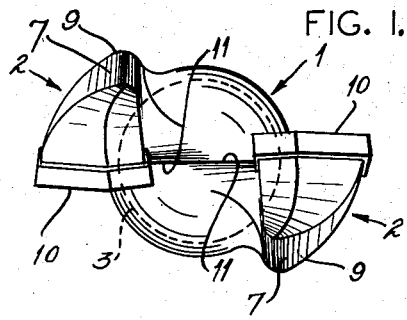
Figure 1 is a plan view of one embodiment of this invention.
Figure 4:
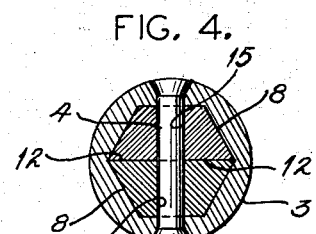
Figure 4 is a sectional view taken along the line 4—4 of Figure 2.
Figure 2:
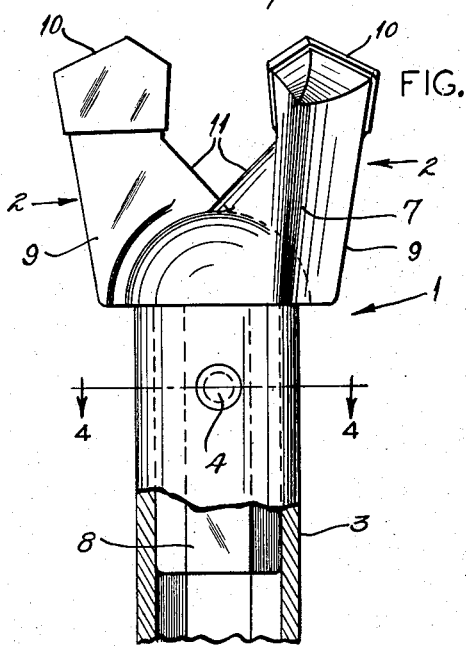
Figure 2 is a view in front elevation.
Figure 3:
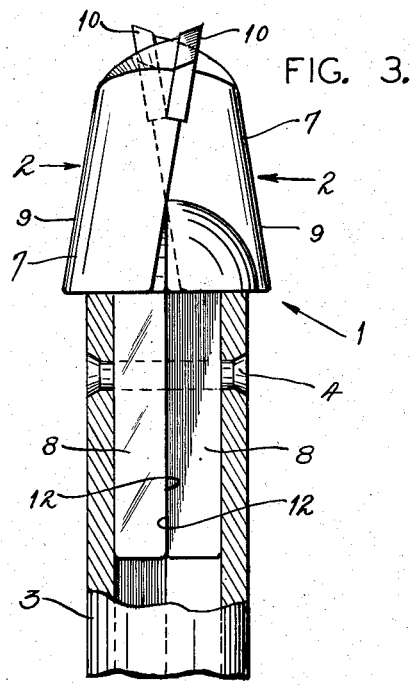
Figure 3 is a view in side elevation.
Figure 5:
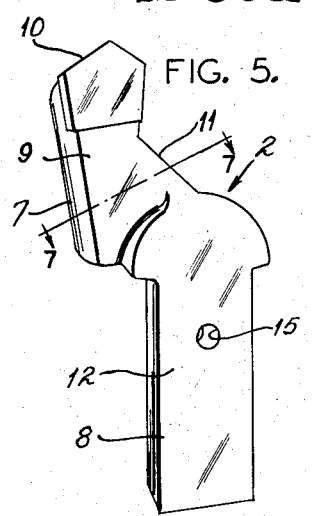
Figure 5 is a perspective view showing the inside surface of a cutting head segment constructed in accordance with this invention.
Figure 6:
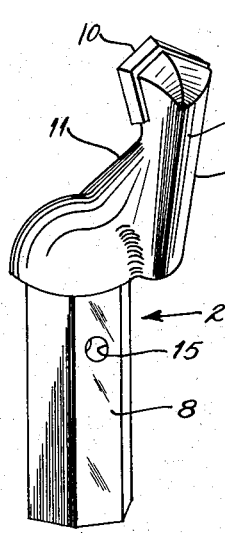
Figure 6 is a perspective view showing the outside surface of a cutting head segment constructed in accordance with this invention.

In manufacturing the cutting head segments 2, the segments are fabricated separately. The tungsten carbide cutting faces of the bit head are cemented in place. The shank section inner surfaces are cast, forged, machined, or ground flat on one side, and the cutting edges, particularly of the bit heads, are ground sharp. The design of the core breaking web is such that an edge capable of effectively cutting the core is produced in the fabricating, though it is easily ground, as can be observed in the drawings in Figures 5 and 6. In operation, two of the cutting head segments are inserted within the socket with the flat sides of their shanks abutting, the pin 4 is inserted through the holes provided, and secured either by peening or any other suitable means, and the cutting head is ready for operation. To replace one segment, it is only necessary to remove the pin 4, draw the segment to be replaced from the socket, replace it with another, and insert the pin 4.

It can be seen that if a three-segment cutting head were employed, the shank section would have to be formed so that its inner surfaces were at an angle of 120 degrees from one another, to render all of the segments identical. It can readily be seen that a greater number of segments could be employed by simply modifying the configuration of the shank section. However, it is clear that the machining or grinding operation is simplest when only two cutting head segments are employed, and that embodiment is preferred.

Since the cutting head is fabricated in identical sections, economies are effected in both manufacture and operation. The breaking of one bit head, or web, necessitates replacing only the broken segment. The grinding and sharpening of the bit head itself is greatly facilitated. The cementing of the tungsten carbide cutting faces of the bit head, a difficult matter with the unitary cutting heads of the prior art, is much simplified.

The provision of a core breaking web enhances the efficiency of the cutting head. Thus the present invention provides a more simple, more efficient cutting head, cheaper to fabricate, and more easily and cheaply maintained, than has been known heretofore.

Having thus described the invention, what is claimed and desired to be secured by Letters Patent is:

1. A mining drill comprising a rotary drill socket and a cutting head removably secured to said socket, said socket having an axially-disposed mouth at its forward end, said cutting head having an elongate shank received within said mouth and a cap abutting against the forward end of the socket, said cap and said elongate shank being segmented in the lengthwise direction to form identical segments, each segment having a web projecting forwardly and outwardly from the cap, the outer part of said web being relatively thick and having a bit head at its forward extremity, the inner part of said web being beveled to a core-breaking edge which extends forwardly and outwardly from the cap toward said bit head, said beveled core-breaking edges of the respective segments being in intersecting relationship with one another forward of said cap.

2. As an article of manufacture, a cutting-head segment for use in cooperation with at least one other identical cutting-head segment to form a cutting head removably securable in a rotary drill socket having an axially-disposed mouth at its forward end; said segment comprising an elongate shank section of a cross-sectional shape corresponding to that of a segment of said mouth, an overhanging cap at the end of said shank section for abutting against the forward end of the socket, a web projecting forwardly and outwardly from the cap, the outer portion of said web being relatively thick and having a bit head at its forward extremity, the inner part of said web being beveled to a core-breaking edge which extends forwardly and outwardly from adjacent the center of said cap to adjacent said bit head, and said beveled core-breaking edges of said segments being in intersecting relationship with one another forward of said cap.

3. As an article of manufacture, a cutting-head segment for use with another identical segment to form a biramous cutting head removably securable to a rotary socket having an axially-disposed mouth of polygonal outline; the segment comprising an elongate shank of a cross section half that of the socket mouth, said shank having a flat face arranged to extend across the axis of said socket when the shank is received within said socket mouth, said shank also being apertured to receive a generally transverse holding pin, a cap at one end of the shank having a flat face coplanar with said flat face of the shank, the cap otherwise being rounded and overhanging the shank, a web projecting forwardly and outwardly from the cap, the outer part of said web being relatively thick and having a bit head at the forward extremity, the inner part of said web being beveled to a core-breaking edge which extends forwardly and outwardly from adjacent the center of the cap to adjacent said bit head, and the inner part of said web having a flat face generally coplanar with said flat face of the cap.

4. An article of manufacture as set forth in claim 3, wherein the outer bit-head supporting portion of the web has a canted cutting face arranged with the portion thereof adjacent the cap set back slightly from said flat face of the cap.

5. A mining drill comprising a rotary drill socket and a cutting head removably secured to said socket, said socket having an axially-disposed mouth at its forward end, said cutting head having an elongate shank received within said mouth, said elongate shank being segmented in the lengthwise direction to form identical segments, each segment having a web projecting forwardly and outwardly from the cap, the outer part of said web being relatively thick and having a bit head at its forward extremity, the inner part of said web being beveled to a core-breaking edge which extends forwardly and outwardly from the shank toward said bit head, and said beveled core-breaking edges of said two segments being in intersecting relationship with one another forward of said cap.

6. As an article of manufacture, a cutting-head segment for use with another identical segment to form a biramous cutting head removably securable to a rotary socket having an axially-disposed mouth of polygonal outline; the segment comprising an elongate shank of a cross section half that of the socket mouth, said shank having a flat face arranged to extend across the axis of said socket when the shank is received within said socket mouth, said shank also being apertured to receive a generally transverse holding pin, a web projecting forwardly and outwardly from the shank, the outer part of said web being relatively thick and having a bit head at the forward extremity, the inner part of said web being beveled to a core-breaking edge which extends forwardly and outwardly from adjacent the center of the shank to adjacent said bit head, and the inner part of said web having a flat face generally coplanar with said flat face of the shank.

7. A mining drill comprising a rotary drill socket and a cutting head removably secured to said socket, said socket having an axially-disposed mouth at its forward end, said cutting head having an elongate shank received within said mouth and a cap abutting against the forward end of the socket, said cap being generally in the shape of a semisphere, said cap and said elongate shank being segmented in the lengthwise direction to form identical segments, each segment having a web projecting forwardly and outwardly from the cap, the outer part of said web being relatively thick and having a bit head at its forward extremity, the inner part of said web being beveled to a core-breaking edge which extends forwardly and outwardly from the cap toward said bit head.

THEODORE E. RASSIEUR.

References Cited in the file of this patent

UNITED STATES PATENTS

| Number | Name | Date |
|---|---|---|
| 1,140,077 | Skeen | May 18, 1915 |
| 1,645,962 | Mills | Oct. 18, 1927 |
| 1,727,655 | Louderback | Sept. 10, 1929 |
| 1,858,988 | Duda | May 17, 1932 |
| 2,461,305 | Winn | Feb. 8, 1949 |

FOREIGN PATENTS

| Number | Country | Date |
|---|---|---|
| 19,433 | Great Britain | Sept. 4, 1902 |
| 10,298 | Great Britain | Oct. 22, 1908 |
| 528,593 | Great Britain | Nov. 1, 1940 |
| 138,619 | Germany | Feb. 3, 1903 |